US012747944B2

(12) United States Patent
Hinderling et al.

(10) Patent No.: US 12,747,944 B2
(45) Date of Patent: Sep. 29, 2026

(54) SURVEYING DEVICE COMPRISING A RANGE IMAGING SENSOR AND A SETTABLE TARGET ILLUMINATOR TO PROVIDE AN AREA ILLUMINATION IN DIFFERENT ILLUMINATION STATES

(71) Applicant: HEXAGON INNOVATION HUB GMBH, Heerbrugg (CH)

(72) Inventors: Jürg Hinderling, Marbach (CH); Simon Bestler, Langenargen (DE); Andreas Walser, St. Gallen (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 789 days.

(21) Appl. No.: 18/078,536

(22) Filed: Dec. 9, 2022

(65) Prior Publication Data

US 2023/0184547 A1 Jun. 15, 2023

(30) Foreign Application Priority Data

Dec. 15, 2021 (EP) .................................... 21214791

(51) Int. Cl.
*G01C 3/08* (2006.01)
*G01C 15/00* (2006.01)
*G01S 17/42* (2006.01)
*G01S 17/89* (2020.01)

(52) U.S. Cl.
CPC ............. *G01C 3/08* (2013.01); *G01C 15/002* (2013.01); *G01S 17/42* (2013.01); *G01S 17/89* (2013.01)

(58) Field of Classification Search
CPC ......... G01C 3/08; G01C 15/002; G01S 17/42; G01S 17/89
See application file for complete search history.

(56) References Cited

U.S. PATENT DOCUMENTS

| | | | | |
|---|---|---|---|---|
| 11,536,841 | B2 * | 12/2022 | Yasutomi ................ | G01S 17/42 |
| 2003/0123045 | A1 | 7/2003 | Riegl et al. | |
| 2010/0091263 | A1 | 4/2010 | Kumagai et al. | |
| 2016/0146604 | A1 | 5/2016 | Metzler et al. | |
| 2022/0091264 | A1 * | 3/2022 | Sasaki ..................... | G01S 17/89 |

(Continued)

FOREIGN PATENT DOCUMENTS

| | | |
|---|---|---|
| CN | 105937904 A | 9/2016 |
| CN | 113167581 A | 7/2021 |
| CN | 113340279 A | 9/2021 |

(Continued)

OTHER PUBLICATIONS

Extended European Search Report dated May 20, 2022 as received in Application No. 21214791.2.

*Primary Examiner* — Mark Hellner
(74) *Attorney, Agent, or Firm* — Maschoff Brennan

(57) ABSTRACT

A surveying device embodied as total positioning system or total station, wherein the surveying device comprises a laser distance measuring module configured to generate a distance measuring beam for a single point measurement to determine a distance to a measurement point targeted by the distance measuring beam. Furthermore, the surveying device comprises a range imaging module with a switchable target illuminator for providing different distance-dependent illumination states of an area illumination comprising a broad and a narrow illumination state.

16 Claims, 5 Drawing Sheets

(56) References Cited

U.S. PATENT DOCUMENTS

2023/0258806 A1* 8/2023 Guo ...................... G01S 7/4865
356/5.01

FOREIGN PATENT DOCUMENTS

| | | | | |
|---|---|---|---|---|
| EP | 3 259 615 | A1 | 12/2017 | |
| EP | 3514489 | A1 * | 7/2019 | ........... G01C 15/002 |
| EP | 3 712 659 | A1 | 9/2020 | |
| EP | 3 839 566 | A1 | 6/2021 | |
| WO | 2007000067 | A1 | 1/2007 | |

* cited by examiner

SURVEYING DEVICE COMPRISING A RANGE IMAGING SENSOR AND A SETTABLE TARGET ILLUMINATOR TO PROVIDE AN AREA ILLUMINATION IN DIFFERENT ILLUMINATION STATES

BACKGROUND

The present disclosure relates to a surveying device embodied as total position system (TPS) or total station. Such surveying devices are used in variety of fields which necessitate measuring coordinative positions of spatial points or determination of geometric relationships, e.g. on construction sites, in industrial facilities, or in land surveying.

For example, total stations are used to measure coordinates of spatial points with respect to the position of the total station, e.g. to generate a set of spatial measurement points referenced to a common coordinate system. A further common functionality of a total station relates to staking out points in the environment, e.g. where a first person aligns a telescope target axis of the total station to match a calculated pose and guides a second person carrying a stake-out device, e.g. comprising a retro-reflector, towards a targeting point, which is defined by the target axis of the total station and a calculated distance from the total station.

By way of example, for a coordinative measurement today's total stations are typically aligned exactly horizontally, e.g. with the help of a bubble level or with a tilt sensor, wherein coordinates of a measuring point are derived by measuring the distance, the horizontal, and the vertical angle while aiming with a targeting component (often referred to as "telescope") to this point. The targeting component provides transmission and reception of a laser beam, wherein a distance in direction of the laser beam is measured by an electro-optic distance measurement device. The electro-optic distance measurement is carried out by emitting the laser beam to provide for a pulse time-of-flight (TOF) measurement method, a phase shift measurement method, or an interferometric method. The orientation of the targeting component is determined by angle measuring means of the total station, e.g. goniometers comprising angle encoders such as absolute or incremental rotary encoders.

Once the surveying device is set up in a specific location, typically a multitude of spatial points are measured such that they can be (e.g. in a rather straight-forward way) referenced to a common coordinate system relative to the surveying device.

Often a measurement project requires relocating the surveying device, e.g. because line-of-sight to all relevant measuring points at once is not given. The surveying device then has to be relocated and newly set up in order to measure all the relevant points. Measurement points (coordinatively measured spatial points) measured from different locations of the surveying device have to be related to each other using a process often referred to as referencing, point set registration, or scan matching. For example, this can be done solely based on the data of the 3D coordinate points measured with the electronic distance measurement comprised in a surveying device. By way of example, known methods for referencing data of a total station at different measurement locations involve the use of a polygon course or the so-called free stationing method.

Nowadays, there is an increasing need of a total station, which is able to record 3D point clouds as quickly and with sufficient accuracy as possible, e.g. in order to produce a precise digitization of objects with natural and artificial surfaces. Often, such total stations are referred to as so-called "scanning total stations" or "robotic total stations". Compared to conventional laser scanners, known scanning total stations are often almost 1000 times slower in providing a 3D point cloud.

One reason for the slower scanning speed is given by the precision requirement, which defines the general setup of a total station, e.g. to provide a coordinate measurement with geodetic precision. The telescope unit is typically mounted with high precision onto a base and a (e.g. forklike) support, wherein high-precision angular sensor are used to provide high pointing stability. This often provokes quite a heavy and bulky construction 5 that contradicts rappid scanning movements.

SUMMARY

It is therefore an object of the present disclosure to provide a surveying device embodied as total positioning system or total station, which overcomes deficiencies of the prior art in providing a 3D point cloud.

A particular object is to provide a surveying device embodied as total positioning system or total station, which provides faster acquisition of a 3D point cloud.

A further object is to provide an improved surveying device embodied as total positioning system or total station, which provides easier handling such that less expertise and training is required to operate the surveying device for the acquisition of a 3D point cloud.

These objects are achieved by the realization of at least part of the characterizing features describer herein. Features that further develop aspects in an alternative or advantageous manner are also described.

The disclosure relates to a surveying device embodied as total positioning system or total station, wherein the surveying device comprises a base and a targeting component, which is rotatable about two alignment axes relative to the base, and angle determining means configured to generate angle data providing an orientation of the targeting component with respect to the two alignment axes. The surveying device comprises a laser distance measuring module configured to generate a distance measuring beam for a single point measurement to determine a distance to a measurement point targeted by the distance measuring beam, wherein the distance measuring beam is emitted via a beam exit at the targeting component.

Typically, the single point measurement by the laser distance measuring module is associated with high-precision pointing information provided by the angle determining means. This allows determining 3D coordinates of a targeted measurement point with geodetic precision. For example, the distance measuring beam is a directed collimated laser beam, which allows to measure a point on an object with optimal (maximal) lateral spatial resolution (small beam footprint on the object) while providing sufficiently high signal return in order to ensure high distance measuring accuracy (high signal-to-noise ratio). In other words, a single-point measurement is a measurement of a single measurement point on an object to be measured, wherein both lateral spatial resolution and distance measuring accuracy are provided as precisely as possible for an object surface hit under a one-dimensional aiming direction.

The surveying device further comprises a range imaging module, which comprises a target illuminator unit arranged at the targeting component and a fixed imaging optical path arranged at the targeting component to image radiation emitted by the target illuminator unit returning from the environment onto a range imaging sensor (so-called RIM-sensor). The range imaging sensor is configured to provide a generation of a depth image using an area illumination of the target illuminator returning from the environment, wherein the depth image is generated with reference to angle data of the angle determining means. Thus, a precise orientation of the range imaging sensor during depth image acquisition can be associated to each depth image and the surveying device is configured to use the reference to the angle data of the angle determining means to provide for a transformation of coordinate information from multiple depth images acquired for different orientations of the targeting component into a common coordinate system.

By way of example, known RIM-sensors (also referred to as 3D-imaging sensors or TOF-sensors) are based on silicon-based CMOS technology. Current trends go towards increased number of pixels, smaller pixel pitch, and increased sensitivity in the near infrared wavelength region, e.g. at 905 nm. RIM sensors of high sensitivity are often configured as back-illuminated sensors because this typically provides higher quantum efficiency and higher fill factor compared to front-side illuminated designs. Recently, a further step for an increased sensitivity, especially at longer wavelengths such as 940 nm, has been achieved by an improved single-photon avalanche diode (SPAD) design. These new types of CMOS-sensors provide more versatile applicability of RIM-cameras, e.g. such as for high-resolution point cloud recording at eye safe wavelengths.

The target illuminator is configured to provide the area illumination in different illumination states comprising a broad and a narrow illumination state, wherein the broad illumination state provides illumination of a larger volume compared to the narrow illumination state.

For example, the target illuminator provides setting of different light cone shapes in order to provide the broad and the narrow illumination states, wherein for the same device-object distance a footprint of a light cone associated to the broad illumination state is larger than a footprint of a light cone associated to the narrow illumination state.

The surveying device is configured to provide for an allocation of sub-areas within an area to be measured on the basis of a distance distribution of measurement points in the area to be measured, wherein each of the sub-areas is associated with an orientation of the targeting component about one or both of the two alignment axes and with one of the different illumination states. The allocation of the sub-areas within the area to be measured and the associated orientation and illumination information are then used to provide the surveying device in such a way that it can automatically execute a scan sequence for measuring the area to be measured. The scan sequence involves sequentially setting each of the orientations of the targeting component associated with the sub-areas and generating a depth image for each of the orientations of the target component using the associated illumination state provided by the allocation of the sub-areas within the area to be measured.

Geodetic or industrial coordinate measurement often requires absolute measurement accuracy in the mm or sub-mm range, which requires that the surveying device is stable against internal and external interference. Often ToF cameras operate in wavelength ranges that are subject to disturbances introduced by sunlight and temperature changes. Thus, in order to reach sufficient distance measuring accuracy, available range imaging sensors, also referred to as ToF-cameras (Time-of-Flight Cameras), often require sufficiently high return signals to allow reaching the needed signal-to-noise level.

One way to address these problems of ToF-cameras is to provide different transmission powers and/or different modulation frequencies of the emission of the area illumination. However, simply increasing transmission power and/or applying high emission frequencies can still be insufficient and/or lead to technical complexity.

The use of different illumination states, e.g. switching between light cones having different solid angles for providing the area illumination, has the advantage of providing a distance dependent trade-off between better-focused transmission power and thus increased irradiance with a maximal field-of-view. In combination with the precise angle information from the angle determining means the surveying device is expanded to an instrument which generates high measurement and point accuracy and provides a sped-up scanning functionality.

In one embodiment, the surveying device is configured to provide for a display of a representation of a surrounding environment and for a querying of a user input to select the area to be measured.

By way of example, the surveying device can be used to provide scanning of a larger scene up to a fulldome scene, wherein multiple depth images are combined to form a single point cloud of large dimensions with an accuracy of angular seconds. After (manual or automatic definition of the area to be measured, the allocation of the sub-areas within the area to be measured and the provision of the associated orientation and illumination information may be provided in a manual, a semi-automatic, or a fully automatic manner.

In one embodiment, the surveying device is configured to provide for a display and editing functionality, which comprises a display of a representation of the area to be measured, an indication of the allocation of the sub-areas within the area to be measured, and a querying of a user input for providing an adjusted allocation of sub-areas within the area to be measured, wherein the scan sequence is executed on the basis of the adjusted allocation.

Thus, in a manual mode, the user aligns the surveying device with the scene and estimates or measures selected distances in the scene with the targeting component and the laser distance measuring module. Based on these distances, the surveying device may then automatically show the user the derived sub-areas, e.g. with associated additional illumination information, such that the user can use an interface, e.g. a graphic interface, to refine and edit the selection of the proposed sub-areas.

In a more automated mode, for example, the surveying is configured to generate an initial depth image or a sequence of initial depth images at different orientations of the targeting component about one or both of the two alignment axes using the broad illumination state. Then, the initial depth image or the sequence of initial depth images is used to determine the distance distribution for providing the allocation of the sub-areas within the area to be measured.

In a further embodiment, the surveying device is configured to access a digital 3D model of the environment and to use the digital 3D model to determine the distance distribution for providing the allocation of the sub-areas within the area to be measured.

For example, a digital terrain model (DTM) or a digital surface model (DSM) is loaded in the surveying device and the corner points of the window of the scene to be measured are set manually at the top left and bottom right of a display of the surveying device. Using the DTM or the DSM, the surveying device knows the rough distances within the field-of-view to be measured and the range imaging module uses this information to determine the sub-areas assigned to the distances and the associated illumination states. The surveying device may then automatically control the necessary angular alignment of the targeting component so that the range imaging module can carry out the scan sequence to provide the consolidated point cloud of the entire scene.

In a further embodiment, the surveying device is configured to provide the allocation of the sub-areas within the area to be measured by further incorporating a scan pattern generated by moving the targeting component and distance measuring with the laser distance measuring module. Here, the area to be measured is initially segmented into areas corresponding to one or multiple illuminations by the broad illumination states, wherein a scanning by the distance measuring beam is used to refine the initial wide-angle segmentation.

An allocation of one or more wide-angle areas to the area to be measured is provided, wherein the one or more wide-angle areas each correspond to illumination areas of illuminations by the broad illumination state for associated orientations of the targeting component. The one wide-angle area or the combination of the wide-angle areas provides full coverage of the area to be measured. A scan pattern is executed by the surveying device by moving the targeting component about one or both of the two alignment axes and determining distances using the distance measuring beam of the laser distance measuring module at different orientations of the targeting component, wherein distance determinations by the distance measuring beam are provided in each of the one or more wide-angle areas. Then a segmentation of the one or more wide-angle areas is provided by using the distances determined by the scan pattern, wherein at least one wide-angle area is segmented into small-angle areas and each of the small-angle areas corresponds to an illumination area provided by an associated orientation of the targeting component and an illumination by an illumination state of the different illumination states that provides illumination of a smaller volume compared to the broad illumination state.

In a further embodiment, the different illumination states further comprise a medium illumination state, which provides illumination of a larger volume compared to the narrow illumination state and a smaller volume compared to the broad illumination state.

In a further embodiment, the range imaging sensor is configured to provide for a setting of differently sized active detection zones and the surveying device is configured to coordinate the setting of the differently sized active detection zones with a setting of the different illumination states of the target illuminator, e.g. by taking into account a distance determined by the laser distance measuring module or the range imaging module.

In a further embodiment, the surveying device is configured to operate within three defined distance measuring ranges, namely a short, a medium, and a far distance measuring range. The short distance measuring range covers distances shorter than the medium and the far distance measuring range. The medium distance measuring range covers distances longer than the short distance measuring range and distances shorter than the far distance measuring range. The far distance measuring range covers distances longer than the short and the medium distance measuring range.

The allocation of the sub-areas comprises: allocation of the sub-areas associated with the narrow illumination state to the medium distance measuring range; allocation of the sub-areas associated with the broad illumination state to the short distance measuring range; and allocation of further sub-areas to the far distance measuring range.

The scan sequence comprises a switching between the laser distance measuring module and the range imaging module to use: the laser distance measuring module and the distance measuring beam for distance determinations in the further sub-areas allocated to the far distance measuring range; the range imaging module for acquiring depth images using the narrow illumination state for distance determinations in the sub-areas allocated to the medium distance measuring range; and the range imaging module for acquiring depth images using the broad illumination state for distance determinations in the sub-areas allocated to the short distance measuring range.

In a further embodiment, the laser distance measuring module is configured to generate the distance measuring beam with a central wavelength in the visual wavelength range and the target illuminator is configured to generate the area illumination with radiation in the near infrared wavelength range. For example, the area illumination can have different optical wavelengths such as 850 nm, 905 nm, or 1064 nm depending on the field of application of the surveying instrument. Disturbing sunlight is less of an issue for indoor use. Therefore, 905 nm may be a beneficial wavelength for indoor applications but not for outdoor applications.

By way of example, the central wavelength of the distance measuring beam is in the range of 620 nm to 700 nm, the radiation of the area illumination is in the wavelength range of 930 nm to 950, and the fixed imaging optical path comprises an optical band pass filter for blocking radiation outside the wavelength range of the area illumination.

For example, the visible distance measuring beam of the laser distance measuring module is preferably used for measurement over large distances, while having at the same time a pointer function. The atmospheric transmission in the visible spectral range is high, which is beneficial for long measuring distances. The 940 nm transmission radiation of the range imaging module is foreseen for short distances. Since the atmospheric transmission is low at 940 nm, influence of sunlight is reduced or practically eliminated, which provides improved distance measuring noise and thus improved distance measurement accuracy. Sunlight outside 930 nm and 950 nm may be blocked by means of an optical interference or band-pass filter such that only the radiation from the target illuminator hits the range imaging sensor. As a result, saturation of the sensor is avoided and the detection signal is kept in the linear detection range.

In a further embodiment, the different illumination states have different transmission powers and/or different emission frequencies.

In a further embodiment, the targeting component comprises a receiving aperture of the fixed imaging optical path and different transmitting apertures for providing the different illumination states, wherein the different transmitting apertures are arranged in a point-symmetrical arrangement around the receiving aperture, e.g. wherein the target illuminator comprises three, particularly six, separate VCSEL transmitting apertures, which are arranged in a circle in a point-symmetrical arrangement around the receiving aperture.

In a further embodiment, the target illuminator comprises a radiation source and is configured for an adaption of a diffusive behavior of the radiation source to provide a switch between the different illumination states.

In a further embodiment, the surveying device is configured to use coordinates of a reference point in the environment determined by the laser distance measuring module to automatically identify the reference point within a first depth image generated by the range imaging module at a first orientation of the targeting component. The surveying device is further configured to automatically pivot the targeting component about one or both of the two alignment axes to move a reference point position within a field-of-view of the range imaging sensor and identify the reference point within a second depth image generated at a second orientation of the targeting component that is different from the first orientation of the targeting component. The coordinates of the reference point determined by the laser distance measuring module and coordinates of the reference point determined from the first and the second depth images are then used to determine a field-of-view-dependent correction parameter for determining coordinates from depth images of the range imaging unit.

In a further embodiment, the surveying device comprises at least one imaging sensor for capturing a 2D image of the environment, wherein the surveying device is configured to provide for a transformation of coordinate information from the 2D image into the common coordinate system. For example, the surveying device is configured to capture the 2D image for the provision of a colorization of a point cloud generated by using the laser distance measuring module.

By way of example, the at least one imaging sensor is embodied as a CMOS-based image sensor, e.g. to capture 2D images of a measurement scene for documentation or to colorize 3D data of a scan. Typically, such image sensors are well calibrated with respect to an instrument coordinate system associated to 3D measurements by the laser distance measuring module and thus the viewing angles associated to the field-of-view of the 2D image sensor and particularly the pixel coordinates of the 2D image sensor are typically known with high precision.

According to this embodiment, the surveying device is further configured to analyze the 2D image to determine a coordinate parameter of a comparison point in the environment, e.g. associated to rims or edges, imaged by the 2D image, and to (e.g. automatically) identify the comparison point within a depth image generated by the range imaging unit. By way of example, the at least one sensor is arranged at the targeting component and the corresponding depth image is generated in the same orientation of the targeting component as for the capturing of the 2D image. The coordinate parameter and coordinates of the comparison point determined from the corresponding depth image are then used to determine a field-of-view-dependent correction parameter for determining coordinates from depth images of the range imaging unit. For example, the field-of-view-dependent correction parameters of this embodiment and of the embodiment described above are combined to provide improved correction over the field-of-view. Alternatively, or in addition, the two correction parameters address different sections or problem areas within the field-of-view of the range imaging sensor.

In a further embodiment, the range imaging module is configured to set a trigger frequency for triggering an emission of the area illumination and a modulation frequency on the range imaging sensor as a function of the different illumination states and particularly as a function of a pivoting speed of the targeting component about one or both of the two alignment axes.

BRIEF DESCRIPTION OF THE DRAWINGS

The surveying device according to the different aspects is described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
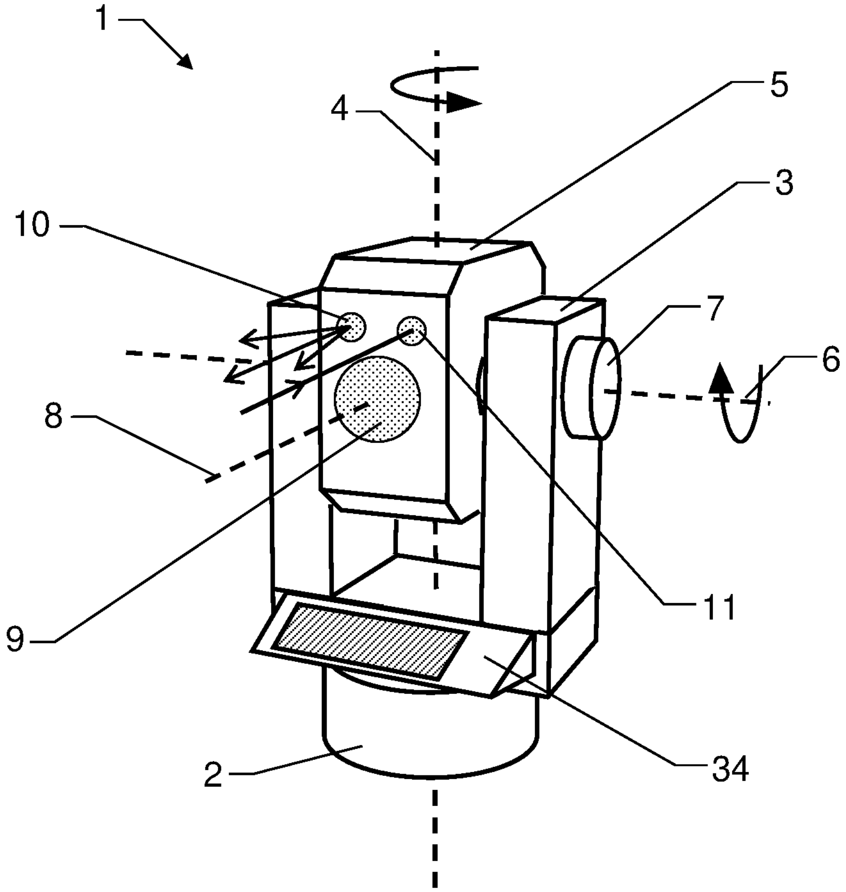
FIG. 1: an exemplary embodiment of a surveying device, wherein the surveying device comprises an electronic laser distance measuring module and a range imaging module.

FIG. 1 exemplarily illustrates the basic structural elements of a surveying device 1 embodied as total positioning system (TPS) or total station. The surveying device comprises a base 2, which is mountable onto a holding apparatus, e.g. in the form of a tripod stand (not shown). A support structure 3 is mounted on the base 2 such that it can be rotated about a vertical axis 4, wherein the support structure 3 holds a targeting component 5 which can be rotated about a horizontal axis 6. Both the support structure 3 and the targeting component 5 are rotatable in a motorized fashion, e.g. by means of a motorized shaft 7, wherein the orientations of the support structure 3 and the targeting component 5 may be determined by corresponding angle encoders (not shown). Optionally, a user interface such as a keyboard-display unit 34 is attached to the surveying device 1, e.g. to the support structure 3. Alternatively, or in addition, the surveying device 1 can be equipped with a wireless interface to a handheld control unit, e.g. whereas the control unit comprises a graphical user interface.

The targeting component 5 is configured to emit a distance measuring beam along an aiming axis 8 towards a target object. By way of example, the objective lens 9 is the same for the transmission and the reception channel of the distance measuring beam. The targeting component 5 houses an opto-electronic distance meter configured to determine a distance to a single target point targeted by the aiming axis 8, based on at least part of the distance measuring beam returning from the target. By way of example, parts of the opto-electronic distance meter, e.g. the beam source, may also be arranged in the support structure 3, wherein a fiber based optical waveguide system connects the elements integrated in the support structure 3 through the shaft 7 into the targeting component 5.

The surveying device 1 further comprises a range imaging module arranged at the targeting component 5, e.g. wherein the range imaging module is mounted in a cover of the targeting component 5. Typically, a range imaging module, also referred to as 3D camera measurement system or 3D TOF camera (TOF: time-of-flight), comprises three sub-units, namely a transmission module 10, also referred to as target illuminator, a range imaging sensor (RIM sensor) and imaging optics 11, and a timing module. The range imaging module may be controlled by a central processor unit of the surveying device.

By way of example, known 3D TOF cameras are based on the phase shift measurement principle or the so-called pulse evaluation principle where an emission time and a reception time of an emitted and received pulse are determined. The phase shift principle is also referred to as indirect time-of-flight (i-TOF) and the pulsed or waveform principle is also referred to as direct time-of-flight (d-TOF). For example, regarding the modulation of the transmitted laser signals in order to achieve a high longitudinal resolution, e.g. of one millimeter, the i-TOF technology has a laser modulation scheme where the laser emits rectangular waves at 40 MHz to more than 200 MHz. In the case of d-TOF sensors, the laser typically emits pulses or pulse sequences of short duration and pulse widths of typically 0.2 ns but not longer than 3 ns.

According to one aspect, the target illuminator 10 is configured to provide an area illumination in different illumination states, wherein a footprint of the area illumination of the scene is switched for different distance ranges, e.g. wherein the emission characteristics of the transmitter unit are adjusted so that scene areas are illuminated differently, e.g. wherein radiation is emitted under different solid angles.

By way of example, the distance measuring beam is emitted with a central wavelength of 658 nm and the area illumination of the target illuminator 10 is emitted with a wavelength of 940 nm. The visible distance measuring beam of the coaxial electronic distance measuring module measures over short and long distances and, thanks to its coaxial arrangement to the target axis 8, also has a pointer function. The infrared transmission radiation is designed for the range imaging sensor and measures exclusively over short or medium distances.

Figure 2:
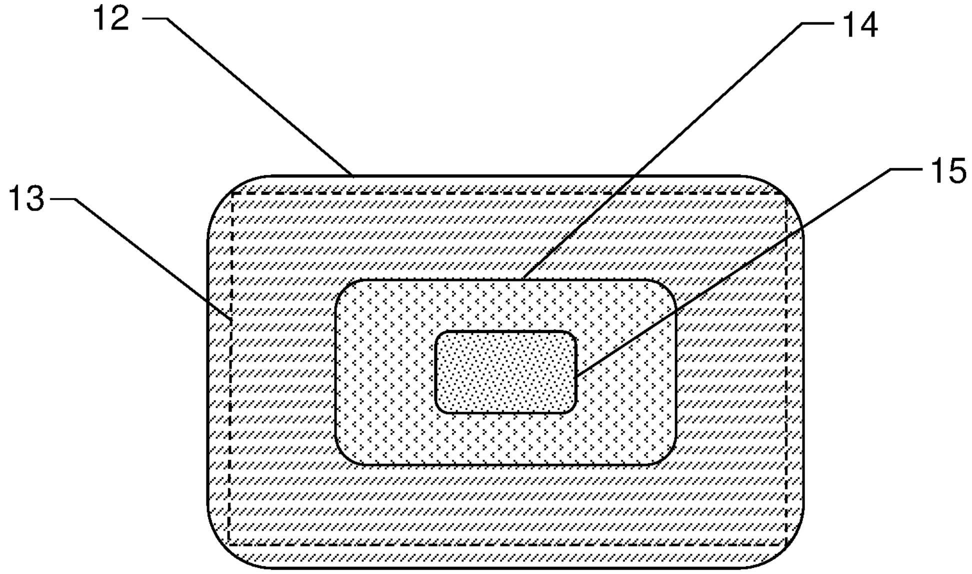
FIG. 2: schematically depicts cross-sections (at the same distance) of different area illuminations generated by the target illuminator.

FIG. 2 schematically depicts cross-sections (at the same distance) of different area illuminations generated by the target illuminator 10. The target illuminator provides a so-called instantaneous field-of-view (i-FOV). For example, the i-FOV is set by the user by means of configuration before the actual measurement campaign or measurement series.

An important criterion from the user's point of view for the choice of the illumination field-of-view of the target illuminator is the measuring distance. In the case of large distances, it may be preferable that the entire transmission power of the transmission unit is concentrated on the smallest possible solid angle in order to keep the irradiance on the surface of the target object sufficiently large. However, a small illumination field-of-view may require pivoting the surveying device multiple times in order to take multiple shots of the scene to be stitched together.

By way of example, when selecting the i-FOV 12, the following modules are switched: the angle of the beam angle of the target illuminator is changed; the transmission power is decreased or increased or kept the same, a data reduction pipeline of the depth images is adapted to the i-FOV, a setting of an active detection zone is adapted to the i-FOV, trigger and modulation frequencies on the RIM sensor and on the transmitter unit are set depending on the selected i-FOV; and internal electronic measurement processes and data evaluation parameters are changed.

The imaging optics 10 (FIG. 1) in front of the RIM sensor remain unaffected. This guarantees that the internal RIM camera calibration to the coordinate system of the surveying device remains unchanged. This way a directional accuracy to the arcsecond can be achieved for coordinate measurements by the distance measuring module and the range imaging module.

For example, the target illuminator is configured to provide a first illumination state 12 providing an i-FOV corresponding to the full field-of-view 13 of the range imaging sensor, a second illumination state 14 providing an i-FOV corresponding to illumination of a quarter of the field-of-view 13 of the range imaging sensor, and a third illumination state 15 providing an i-FOV corresponding to illumination of 1⁄16 of the field-of-view 13 of the range imaging sensor. The first illumination state is used for measuring short ranges, e.g. 0 m to 30 m, the second illumination state is used for measuring medium ranges, e.g. 5 m to 60 m, and the third illumination state is used for measuring long ranges, e.g. 10 m to 100 m. Beyond that, the laser distance measuring module (the laser distance measuring beam) of the surveying device is used.

The four settings (first, second, third illumination states, and use of the laser distance measuring module) can also include different transmission powers and emission times in addition to different spatial radiation bundles. The transmission power and emission duration of the settings are preferably designed so that the radiation is safe for the eyes.

The switchable solid angle of the target illuminator of the 3D camera has the advantage of generating high-quality measurement data at greater distances, thanks to better focused transmission power and thus increased irradiance with a reduced field-of-view.

For example, the setting of the target illuminator light cone can be effected by means of a switchable hologram, by activating the FOVs of assigned laser arrays, or by addressable laser arrays. Addressable laser arrays, for example, may provide advantages because the different target illuminator light cones can be switched purely electronically, wherein the radiation is emitted towards the target by single common optics.

With the second and third illumination states 14, 15, only part of the receiver's field of view 13 is illuminated. In order to improve signal-to-noise, only this partial area may be read out and transformed into a common, consolidated point cloud of the digitized environment.

Figure 3:
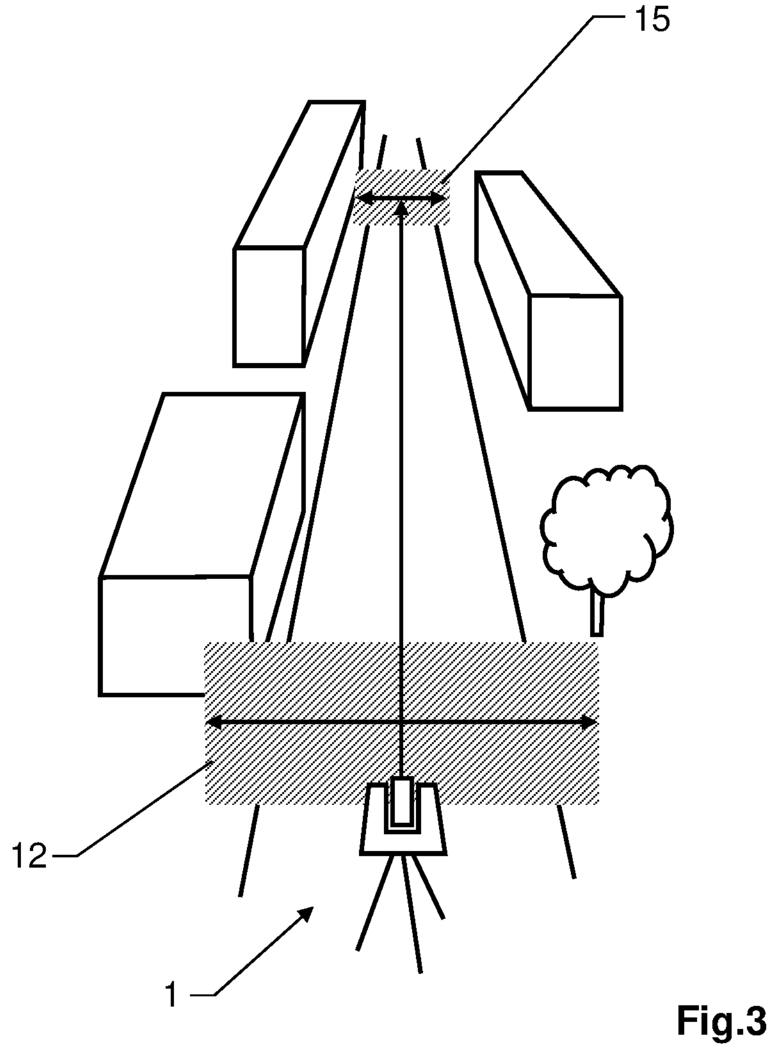
FIG. 3: an exemplary application of a surveying device with switchable target illuminator for measuring a street.

FIG. 3 shows an exemplary application of a surveying device 1 with switchable target illuminator. Here, a street with adjacent artifacts is measured. The figure shows the footprints of the i-FOVs of the first and the third illumination state 12, 15 explained with respect to FIG. 2. For example, with the first illumination state 12 the road can be measured from approx. 10 m to 30 m, wherein larger distances are not sufficiently accurately determined by the first illumination state 12 due to insufficient sensitivity. Therefore, the second illumination state (not shown) is used for intermediate distances, e.g. 30 m to 60 m and the third illumination state 15 is used for long distance, e.g. distances between 60 m to 100 m.

Optionally, the entire length of the road could be measured and digitized with the third illumination state 15. However, because of the restricted i-FOV of the third illumination state 15, several recordings are required in the near distance range, which are carried out by swiveling the targeting component of the surveying device.

Figure 4:
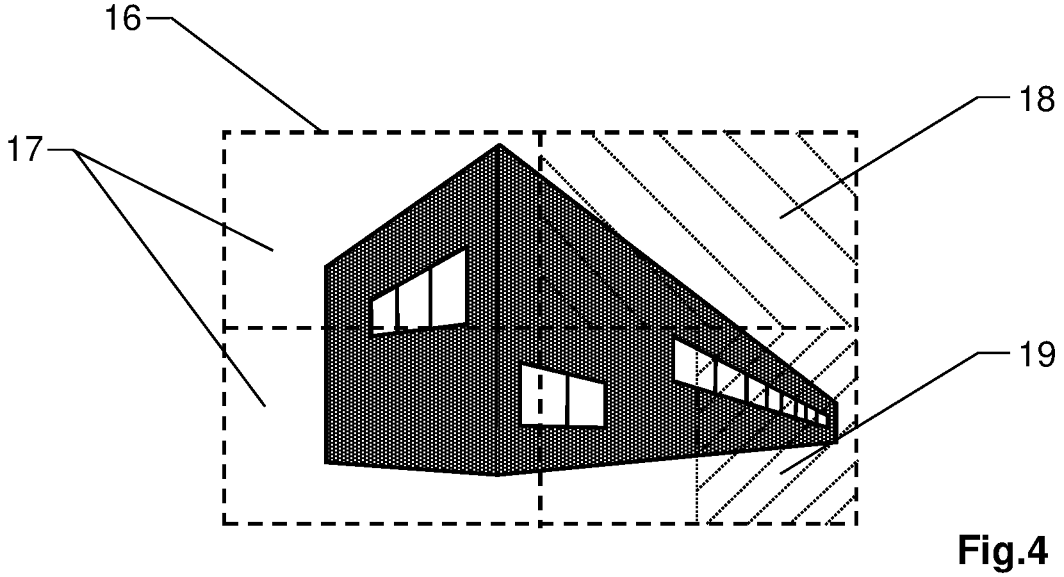
FIG. 4: a further exemplary application of the inventive surveying device, wherein a scene is measured with sufficient point density and in the shortest possible time.

FIG. 4 shows a further exemplary application of the inventive surveying device, wherein a scene is measured with sufficient point density (e.g. without many missing points) and in the shortest possible time. Here, the scene comprises a building, wherein the perspective from the position of the surveying device requires to differ between at least three different measuring ranges of the range imaging module.

For example, a user defines an area to be measured 16, e.g. via a graphical user interface of the surveying device. Here, for the sake of simplicity, the area to be measured 16 corresponds to the largest i-FOV provided by the range imaging module. The two left quadrants 17 of the area to be measured 16 correspond to close range measurements, which are well-suited for range imaging measurements using the largest i-FOV. The top right quadrant 18 of the area to be measured 16 comprises a part of the building, which should be measured by another illumination state, e.g. an illumination state providing a fourth of the full i-FOV, because measurements using the full i-FOV would not provide sufficient sensitivity (the distances to be measured of the scene are longer than the distances to be achieved by the range imaging sensor in this i-FOV setting). The bottom right quadrant comprises on the left a part of the building that could be measured by using the illumination state used for the top right quadrant 18. However, the right part 19 comprises a part of the building that is even further away and should be measured by a more concentrated illumination state, e.g. an illumination state providing an eighth of the full i-FOV.

Figure 5:
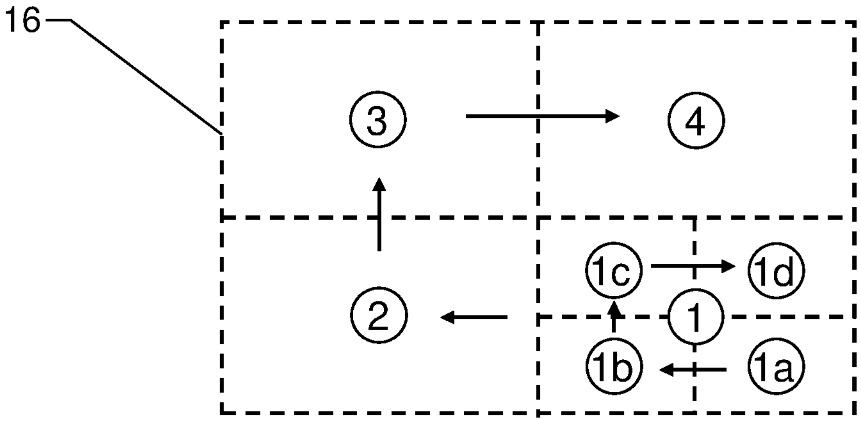
FIG. 5: schematically depicts a so-called manual measurement mode to provide for an allocation of sub-areas within an area to be measured on the basis of a distance distribution of measurement points in the area to be measured.
Figure 6:
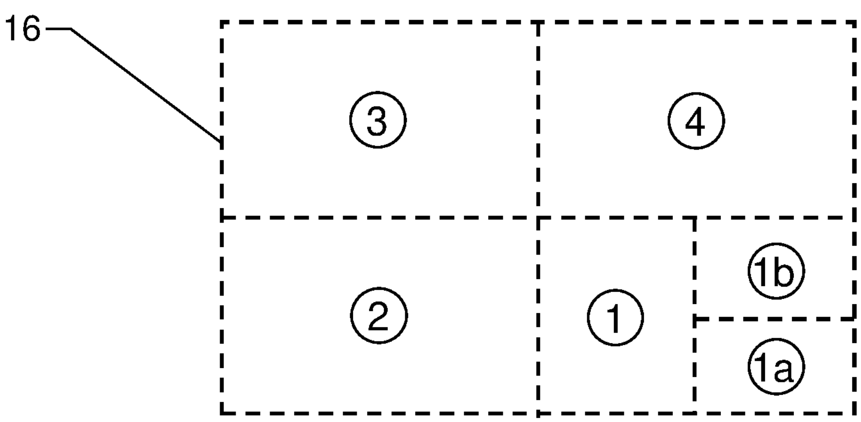
FIG. 6: schematically depicts a so-called semi-automatic measurement mode to provide for an allocation of sub-areas within an area to be measured on the basis of a distance distribution of measurement points in the area to be measured.
Figure 7:
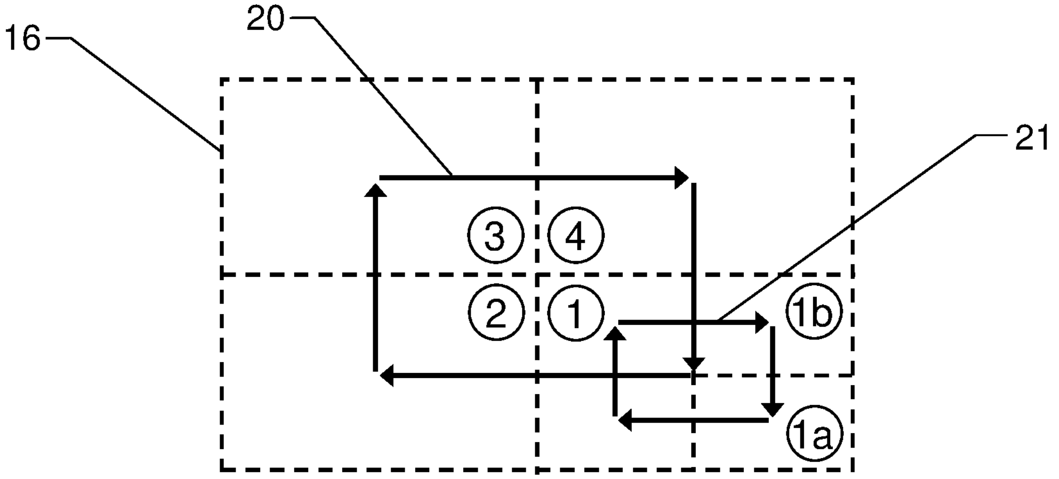
FIG. 7: schematically depicts a so-called fully automatic measurement mode to provide for an allocation of sub-areas within an area to be measured on the basis of a distance distribution of measurement points in the area to be measured.

By way of example, the scene depicted by FIG. 4 can be measured in a manual, a semi-automatic, or a fully automatic manner as schematically depicted by FIGS. 5 to 7. The surveying device is set up and referenced to an external, e.g. global, coordinate system. This is done by means of control or reference points in the area of the building.

The scene to be measured is recorded, for example, by the largest i-FOV, but in this i-FOV the range imaging camera is not sensitive enough to measure all parts of the building. For example, the sensitivity of the range imaging camera is influenced by the selected i-FOV on the transmitter side and by the exposure or accumulation time on the receiver side. By setting the frame rate, the signal accumulation time of the individual pixels or subpixels is determined. The target illuminator emits shorter or longer burst sequences, depending on the length of the accumulation time set on the sensor side. The frame rate set by the user or the specified maximum image acquisition time informs the camera whether only one image or several images per target scene are required.

In the manual measurement mode depicted by FIG. 5, the user aligns the surveying device with the scene. The user estimates or measures selected distances in the scene with the internal distance measuring module using the distance measuring beam emitted along the target axis. Based on these distances, the instrument automatically derives a proposed selection of different i-FOVs to measure the scene, which, for example is presented on a display of a graphical user interface of a handheld control unit or a keyboard-display unit 34 (FIG. 1) of the surveying device. The user can then edit or re-define the selection of the proposed i-FOVs.

In the example shown, a selection of seven i-FOVs and corresponding targeting directions of the targeting component are derived. In the bottom right quadrant the proposed scan sequence includes four measuring steps (four targeting directions) using the smallest available i-FOV. Then the scan sequence continues with measuring the other three quadrants by using an i-FOV four times larger than the smallest i-FOV.

After the user has edited or accepted the proposed scan sequence, the surveying device starts the measurement and aligns its target axis and thus the i-FOVs of the range imaging unit in the directions given by the seven measuring steps. With each alignment, the range imaging unit creates 3D coordinates of the scene with the specified i-FOVs.

By way of example, the range imaging unit can acquire HDR-like (HDR: high dynamic range) depth images in any orientation, depending on the set maximum image acquisition time. Long image acquisition times can accumulate for a long time, which increases the range (somewhat) and reduces the distance jitter for dark targets. Accordingly, the illumination/pulse burst switch-on times and the duration of the laser bursts corresponding to each modulation frequency are set on the transmitter side.

In the semi-automatic measurement mode depicted by FIG. 6, the surveying device has access to a digital terrain model (DTM) or a digital surface model (DSM). The corner points of the area to be measured 16 are set manually, e.g. by indicating the top left and bottom right corner on a display of the surveying device. Using the digital terrain model, the surveying device knows the rough distances within the area to be measured 16. This information is then used to automatically determine i-FOVs in accordance with these rough distances.

In the example shown, six measuring steps associated with six corresponding pointing directions of the targeting component are identified. The bottom right quadrant is measured by three different pointing directions and two different i-FOVs (measuring the right part of the quadrant uses i-FOVs of half the size of the i-FOV of the left part of the quadrant). Again the other quadrants, corresponding to closer areas of the building, are measured by using large i-FOVs.

In the fully automatic measurement mode depicted by FIG. 7, the user defines the corner points of the area to be measured 16 manually, e.g. by entering markings on a display of the surveying device. In a further step, the scene is divided into areas of the largest i-FOV. In the example, shown, the scene roughly corresponds to the size of a single, largest i-FOV. In a further step, the surveying device moves the targeting component to scan the target axis along a first track 20, wherein distance determinations by the distance measuring beam are provided at a defined measuring rate. Since the distances in the bottom left quadrant and the two top quadrants correspond to the distance measuring range associated to an i-FOV being a fourth of the larges i-FOV, the area to be measured is divided into these four quadrants. Furthermore, the surveying device has determined that at least parts of the bottom right quadrant can only be measured with a smaller i-FOV. Therefore the bottom right quadrant is further divided into four areas that correspond to the size of the smallest i-FOV.

Optionally, the surveying device is configured to carry out a further scan of the target axis along a track 21 within the bottom right quadrant in order to optimize the i-FOVs in this quadrant. For example, in such an additional scan, it turns out that only the right part of the bottom quadrant requires measurements by the smallest i-FOV while the left part can be measured by using the same i-FOV as used for the other quadrants of the area to be measured 16. Thus, a total of six different pointing directions and two different i-FOVs are identified, four pointing directions corresponding to the four quadrants of the area to be measured 16 using a medium i-FOV and two pointing directions corresponding to two different pointings in the right part of the bottom right quadrant of the area to be measured 16 using the smallest i-FOV (wherein measurement results on the right part of the bottom right quadrant measured by the medium i-FOV are replaced by measurement results generated by using the smallest i-FOV).

Figure 8:
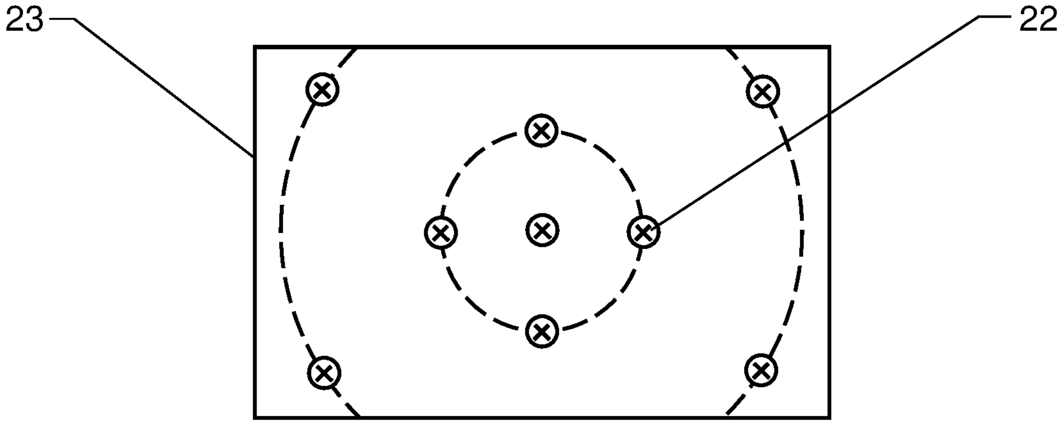
FIG. 8: schematically depicts a calibration of field-of-view-dependent correction parameters for determining coordinates from depth images of the range imaging unit.

FIG. 8 schematically depicts a calibration of field of view-dependent correction parameters for determining coordinates from depth images of the range imaging unit.

By way of example, initially, the range imaging unit is referenced to a local coordinate system of the surveying device by means of a factory calibration. In addition, the user is provided with a field calibration option to further calibrate the range imaging unit, e.g. for temperature or orientation dependent distortion effects due to stress on the imaging optics and/or the range imaging sensor. This can be done with different distances (longitudinal errors) and with various target settings of the targeting component (angular errors with different target directions and twisting or tilting of the sensor). The calibrated and inherently precise direction of the distance measuring beam of the laser distance measuring module is used as the reference. In this way, both distance offsets for determining an absolute distance and angular direction offsets (optical distortion) can be determined.

For example, the user manually targets the laser distance measuring beam to various easily identifiable reference points 22 in an i-FOV to be calibrated 23. The 3D coordinates of these points are known with sub-millimeter accuracy using the angle sensors and the precision distance measurement by the laser distance measuring module. In a further step, the range imaging module acquires a depth image, making sure that the reference points 22 that have already been measured are in the i-FOV of the range imaging module.

Alternatively, or in addition, the identification and assignment of reference points 22 is carried out automatically, e.g. by an automatic search functionality of the surveying device.

It is also possible to only use one reference point, wherein the targeting component is moved to acquire multiple depth images at different orientations such that the one reference point is placed at different positions within the different depth images.

Figure 9:
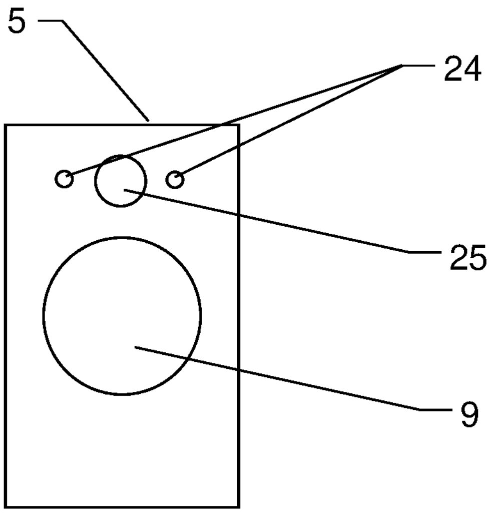
FIG. 9: schematically depicts an embodiment of a targeting component, wherein emitting apertures of the target illuminator are arranged point-symmetrically around an objective lens of the imaging optics of the range imaging module.

FIG. 9 schematically depicts an embodiment of a targeting component 5, wherein emitting apertures 24 are arranged point-symmetrically around an objective lens 25 of the imaging optics of the range imaging module, e.g. wherein the emitting apertures 24 are arranged above the objective 9 of the laser distance measuring module of the surveying device.

For example, by means of symmetrically arranged transmitting apertures to the receiving aperture, distance measurements with high absolute accuracy are possible because disturbing influences due to the parallax between the transmitting aperture and receiving aperture of the range imaging module are eliminated (parallax-related distance variations cancel each other out over the entire field of view as well as over the distance).

Figure 10:
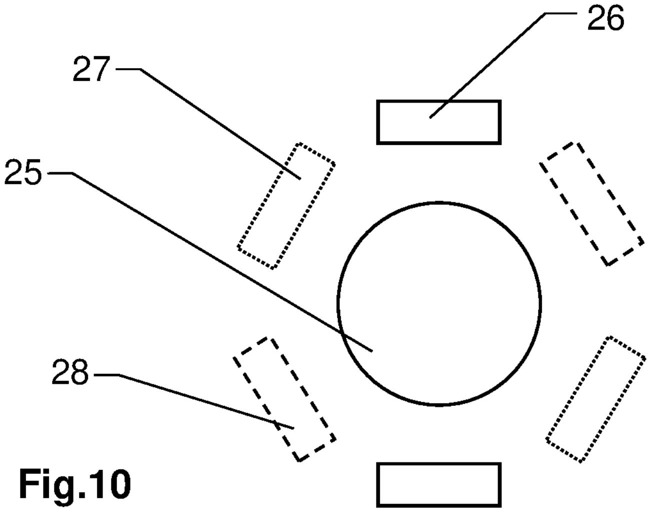
FIG. 10: schematically depicts a further embodiment of the transmission unit of the range imaging module, wherein six separate laser apertures are circularly arranged in a point-symmetrical manner around the objective lens of the imaging optics of the range imaging module.

FIG. 10 schematically depicts a further embodiment of the transmission unit of the range imaging module, wherein six separate laser apertures, e.g. of VSCEL laser diodes or addressable VCSEL arrays, are circularly arranged in a point-symmetrical manner around the objective lens 25 of the imaging optics of the range imaging module. The six laser apertures are configured that there are three pairs 26, 27, 28 of laser apertures, wherein apertures of the same pair are arranged opposite each other and apertures of different pairs of apertures generate different light cones, e.g. light cones emitting radiation under different light cone angles.

By way of example, the six laser apertures are generated by six separate laser diodes circularly arranged in a point-symmetrical manner around the objective lens 25 of the imaging optics. Alternatively, addressable VCSEL arrays are located behind the six apertures. The different light cones of the emitting radiation are realized by activation of areas of different size on the addressable VCSEL arrays. For example, all six apertures are addressed by the same pattern, so all six apertures produce the same light cone angles. One benefit of a distribution of the radiated laser power over six apertures may be seen in the provision of high laser power at low laser class.

Figure 11:
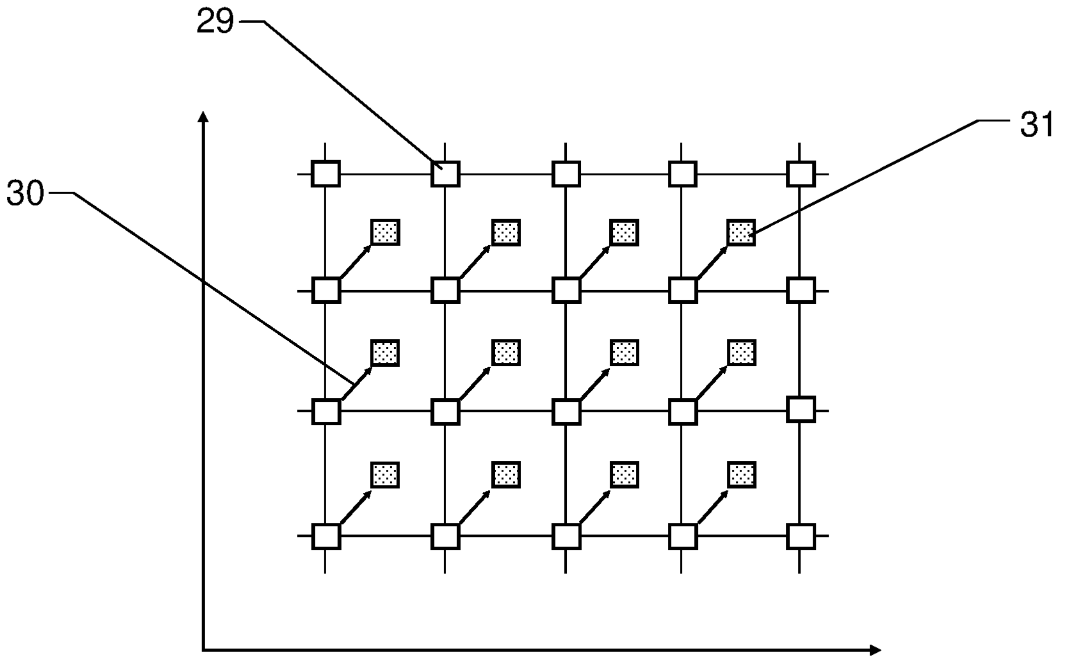
FIG. 11: schematically depicts an embodiment wherein subpixel resolution is achieved for the range imaging module by making use of the precise angle determining system of the surveying device.
Figure 11:
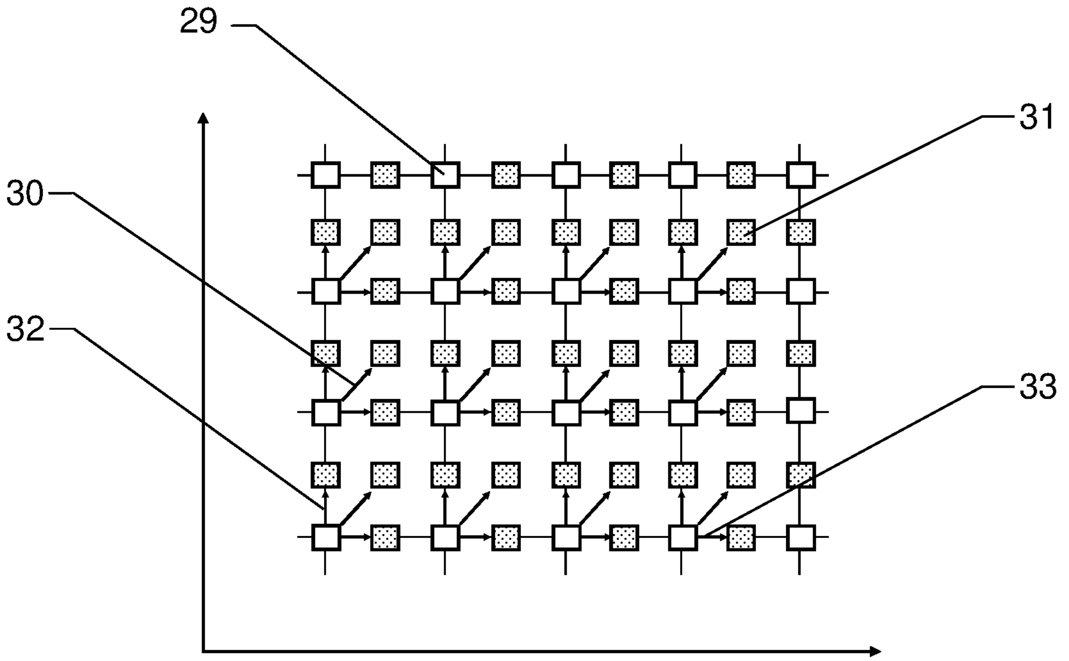

FIG. 11 schematically depicts an embodiment wherein subpixel resolution is achieved for the range imaging module by making use of the precise angle determining system of the surveying device. With defined swiveling of the targeting component in the angular range of subpixels of the range imaging sensor, several depth images are acquired.

The top of the figure depicts a horizontal versus vertical arrangement of measurement points 29 associated to a grid of sensor pixels. By introducing a first movement 30 of the targeting component that introduces a shift of the initial grid of measurement points by less than a pitch between neighboring pixels allows to acquire a second depth image with measurement points 31 shifted by subpixels with respect to the first measurement points 29. Thus, by combining these two depth images the scene is acquired with subpixel resolution. The bottom of the figure depicts the result of acquiring depth images with two further movements 32, 33. Thus, the point spacing is halved to with just four acquisitions. Using the axes and the angle system of the surveying device, the point density of a surface to be digitized can be increased almost at will without the range imaging sensor having to provide the corresponding pixel resolution.

Thus, thanks to the precise angle determining and angle setting means of the surveying device, the surveying device may be configured to provide a resolution enhancement functionality, wherein the targeting component is automatically pivoted about one or both of the two alignment axes with an angular pivoting range of subpixels on the range imaging sensor. Then depth images are combined which were acquired with different pivoting states of the targeting component about one or both of the two alignment axes in order to provide a combined depth image of sub-pixel resolution compared to the intrinsically provided pixel resolution of the range imaging sensor.

By way of example, the subpixel acquisition process is applied when longer distances should be measured since the spatial resolution with a fixed focal length receiving optics of the RIM sensor shrinks down with increasing distance. For example when using a RIM-sensor of VGA format having a pixel number of 640×460 pixels and an imaging optics generating an i-FOV 65°×48° as the largest i-FOV, the spatial resolution of the RIM-sensor is 0.1°×0.1° per pixel. This corresponds to a point spacing of 17 mm at a distance of 10 m and 17 cm at 100 m. Such a resolution is sufficient for many construction and surveying applications up to 100 m. However, for detailed recordings of surfaces a higher spatial resolution may be required, especially for distances longer than 50 m. As shown in the top of FIG. 11, by acquiring a second depth image with measurement points 31 shifted by subpixels with respect to the first measurement points 29, the resolution of the point cloud is doubled and the angular resolution increased by the square root of two. At 100 m the angular spacing of the points is shrinked down to 12 cm, particularly thanks to the precise angle determining and angle setting means of the surveying device.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A surveying device embodied as total positioning system or total station, wherein the surveying device comprises a base and a targeting component, which is rotatable about two alignment axes relative to the base, angle determining means configured to generate angle data providing an orientation of the targeting component with respect to the two alignment axes, and a laser distance measuring module configured to generate a distance measuring beam for a single point measurement to determine a distance to a measurement point targeted by the distance measuring beam, wherein the distance measuring beam is emitted via a beam exit at the targeting component, wherein the surveying device comprises a range imaging module, which comprises a target illuminator arranged at the targeting component and a fixed imaging optical path arranged at the targeting component to image radiation emitted by the target illuminator returning from the environment onto a range imaging sensor, wherein the target illuminator is configured to provide an area illumination in different illumination states comprising a broad and a narrow illumination state, wherein the broad illumination state provides illumination of a larger volume compared to the narrow illumination state, and the range imaging sensor is configured to provide generation of a depth image using the area illumination of the target illuminator returning from the environment, wherein the depth image is generated with reference to angle data of the angle determining means, the surveying device is configured to provide for an allocation of sub-areas within an area to be measured on the basis of a distance distribution of measurement points in the area to be measured, wherein each of the sub-areas is associated with an orientation of the targeting component about one or both of the two alignment axes and with one of the different illumination states, the surveying device is configured to automatically execute a scan sequence for measuring the area to be measured by sequentially setting each of the orientations of the targeting component associated with the sub-areas and by generating a depth image for each of the orientations of the targeting component using the associated illumination state provided by the allocation of the sub-areas within the area to be measured, and the surveying device is configured to use the reference to the angle data of the angle determining means to provide for a transformation of coordinate information from the depth images into a common coordinate system.

2. The surveying device according to claim 1, wherein the different illumination states comprise a medium illumination state, which provides illumination of a larger volume compared to the narrow illumination state and a smaller volume compared to the broad illumination state.

3. The surveying device according to claim 1, wherein the surveying device is configured to provide for a display of a representation of a surrounding environment and for a querying of a user input to select the area to be measured.

4. The surveying device according to claim 1, wherein the surveying device is configured to generate an initial depth image or a sequence of initial depth images at different orientations of the targeting component about one or both of the two alignment axes using the broad illumination state and to use the initial depth image or the sequence of initial depth images to determine the distance distribution for providing the allocation of the sub-areas within the area to be measured.

5. The surveying device according to claim 1, wherein the surveying device is configured to access a digital 3D model of the environment and to use the digital 3D model to determine the distance distribution for providing the allocation of the sub-areas within the area to be measured.

6. The surveying device according to claim 1, wherein the surveying device is configured to provide for a display and editing functionality, which comprises a display of a representation of the area to be measured, an indication of the allocation of the sub-areas within the area to be measured, and a querying of a user input for providing an adjusted allocation of sub-areas within the area to be measured, wherein the scan sequence is executed on the basis of the adjusted allocation.

7. The surveying device according to claim 1, wherein the surveying device is configured to provide the allocation of the sub-areas within the area to be measured by providing an allocation of one or more wide-angle areas to the area to be measured, the one or more wide-angle areas each corresponding to illumination areas of illuminations by the broad illumination state for associated orientations of the targeting component, wherein the one wide-angle area or the combination of the wide-angle areas provides full coverage of the area to be measured, executing a scan pattern generated by moving the targeting component about one or both of the two alignment axes and determining distances using the distance measuring beam of the laser distance measuring module at different orientations of the targeting component, wherein distance determinations by the distance measuring beam are provided in each of the one or more wide-angle areas, and providing a segmentation of the one or more wide-angle areas by using the distances determined by the scan pattern, wherein at least one wide-angle area is segmented into small-angle areas and each of the small-angle areas corresponds to an illumination area provided by an associated orientation of the targeting component and an illumination by an illumination state of the different illumination states that provides illumination of a smaller volume compared to the broad illumination state.

8. The surveying device according to claim 1, wherein the range imaging sensor is configured to provide for a setting of differently sized active detection zones and the surveying device is configured to coordinate the setting of the differently sized active detection zones with a setting of the different illumination states of the target illuminator, by taking into account a distance determined by the laser distance measuring module or the range imaging module.

9. The surveying device according to claim 1, wherein the surveying device is configured to operate within three defined distance measuring ranges, namely a short, a medium, and a far distance measuring range, wherein the short distance measuring range covers distances shorter than the medium and the far distance measuring range, the medium distance measuring range covers distances longer than the short distance measuring range and distances shorter than the far distance measuring range, and the far distance measuring range covers distances longer than the short and the medium distance measuring range, wherein the allocation of the sub-areas comprises allocation of the sub-areas associated with the narrow illumination state to the medium distance measuring range, allocation of the sub-areas associated with the broad illumination state to the short distance measuring range, and allocation of further sub-areas to the far distance measuring range, wherein the scan sequence comprises a switching between the laser distance measuring module and the range imaging module to use the laser distance measuring module and the distance measuring beam for distance determinations in the further sub-areas allocated to the far distance measuring range, the range imaging module for acquiring depth images using the narrow illumination state for distance determinations in the sub-areas allocated to the medium distance measuring range, and the range imaging module for acquiring depth images using the broad illumination state for distance determinations in the sub-areas allocated to the short distance measuring range.

10. The surveying device according to claim 1, wherein the laser distance measuring module is configured to generate the distance measuring beam with a central wavelength in the visual wavelength range and the target illuminator is configured to generate the area illumination with radiation in the near infrared wavelength range, wherein the central wavelength of the distance measuring beam is in the range of 620 nm to 700 nm, the radiation of the area illumination is in the wavelength range of 930 nm to 950, and the fixed imaging optical path comprises an optical band pass filter for blocking radiation outside the wavelength range of the area illumination.

11. The surveying device according to claim 1, wherein the different illumination states have different transmission powers and/or different modulation frequencies of the emission of the area illumination, and/or the range imaging module is configured to set a trigger frequency for triggering an emission of the area illumination and a modulation frequency on the range imaging sensor as a function of the different illumination states and particularly as a function of a pivoting speed of the targeting component about one or both of the two alignment axes.

12. The surveying device according to claim 1, wherein the targeting component comprises a receiving aperture of the fixed imaging optical path and different transmitting apertures for providing the different illumination states, wherein the different transmitting apertures are arranged in a point-symmetrical arrangement around the receiving aperture, wherein the target illuminator comprises three separate transmitting apertures, which are arranged in a circle in a point-symmetrical arrangement around the receiving aperture.

13. The surveying device according to claim 1, wherein the target illuminator comprises a radiation source and is configured for an adaption of a diffusive behavior of the radiation source to provide a switch between the different illumination states.

14. The surveying device according to claim 1, wherein the surveying device is configured to use coordinates of a reference point in the environment determined by the laser distance measuring module to automatically identify the reference point within a first depth image generated by the range imaging module at a first orientation of the targeting component, automatically pivot the targeting component about one or both of the two alignment axes to move a reference point position within a field-of-view of the range imaging sensor and identify the reference point within a second depth image generated at a second orientation of the targeting component that is different from the first orientation of the targeting component, and use the coordinates of the reference point determined by the laser distance measuring module and coordinates of the reference point determined from the first and the second depth images to determine a field-of-view-dependent correction parameter for determining coordinates from depth images of the range imaging unit.

15. The surveying device according to claim 1, wherein the surveying device comprises at least one imaging sensor for capturing a 2D image of the environment, wherein the surveying device is configured to provide for a transformation of coordinate information from the 2D image into the common coordinate system, particularly wherein the surveying device is configured to capture the 2D image for the provision of a colorization of a point cloud generated by using the laser distance measuring module, wherein the surveying device is configured to analyze the 2D image to determine a coordinate parameter of a comparison point in the environment imaged by the 2D image, identify the comparison point within a depth image generated by the range imaging unit, particularly wherein the at least one imaging sensor is arranged at the targeting component and the corresponding depth image is generated in the same orientation of the targeting component as for the capturing of the 2D image, and use the coordinate parameter and coordinates of the comparison point determined from the corresponding depth image to determine a field-of-view-dependent correction parameter for determining coordinates from depth images of the range imaging unit.

16. The surveying device according to claim 1, wherein the targeting component comprises a receiving aperture of the fixed imaging optical path and different transmitting apertures for providing the different illumination states, wherein the different transmitting apertures are arranged in a point-symmetrical arrangement around the receiving aperture, wherein the target illuminator comprises six separate transmitting apertures, which are arranged in a circle in a point-symmetrical arrangement around the receiving aperture.

* * * * *